United States Patent
Nakagawa

(10) Patent No.: US 6,990,593 B2
(45) Date of Patent: Jan. 24, 2006

(54) METHOD FOR DIVERTING POWER RESERVES AND SHIFTING ACTIVITIES ACCORDING TO ACTIVITY PRIORITIES IN A SERVER CLUSTER IN THE EVENT OF A POWER INTERRUPTION

(75) Inventor: O Sam Nakagawa, Redwood City, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 701 days.

(21) Appl. No.: 09/919,134

(22) Filed: Jul. 31, 2001

(65) Prior Publication Data

US 2003/0037150 A1  Feb. 20, 2003

(51) Int. Cl.
G06F 1/30 (2006.01)

(52) U.S. Cl. ............ 713/300; 713/320; 713/324

(58) Field of Classification Search ........ 713/300, 713/340, 310, 320, 324; 709/223, 229, 226
See application file for complete search history.

(56) References Cited

U.S. PATENT DOCUMENTS

| | | | | |
|---|---|---|---|---|
| 5,381,554 A | * | 1/1995 | Langer et al. ............ 714/14 |
| 5,532,524 A | * | 7/1996 | Townsley et al. ............ 307/64 |
| 6,134,673 A | * | 10/2000 | Chrabaszcz ............ 714/13 |
| 6,226,377 B1 | * | 5/2001 | Donaghue, Jr. ........ 379/265.13 |
| 6,377,782 B1 | * | 4/2002 | Bishop et al. ............ 455/3.01 |
| 6,708,209 B1 | * | 3/2004 | Ebata et al. ............ 709/223 |
| 2001/0003831 A1 | * | 6/2001 | Boland ............ 709/226 |

* cited by examiner

Primary Examiner—Lynne H. Browne
Assistant Examiner—Paul Yanchus
(74) Attorney, Agent, or Firm—Lloyd E. Dakin

(57) ABSTRACT

A system and method for Quality of Service (QoS) based server cluster power management is disclosed. The method of the present invention includes: grouping activities within a server cluster into predefined sets; assigning a priority level to each set; identifying a server hosting a set of lower-priority activities within the cluster; receiving a power interruption signal; and diverting power reserves of the server to another server in the cluster, in response to the power interruption signal. The system of the present invention includes: servers, hosting a plurality of activity sets each having an associated QoS level; power reserves coupled to the servers; a switch matrix coupled to direct the power reserves between the servers; and a power manager, coupled to the switch matrix, for commanding the switch matrix to divert power from servers hosting low QoS activity sets to servers hosting high-priority activity sets, in response to a power interruption.

20 Claims, 6 Drawing Sheets

METHOD FOR DIVERTING POWER RESERVES AND SHIFTING ACTIVITIES ACCORDING TO ACTIVITY PRIORITIES IN A SERVER CLUSTER IN THE EVENT OF A POWER INTERRUPTION

BACKGROUND OF THE INVENTION

1. Field of the Invention

The present invention relates generally to systems and methods for server cluster power management, and more particularly for quality of service based server cluster power management.

2. Discussion of Background Art

A modem trend in network management is to an "always-on" model. Such a model recognizes the pervasiveness of computers and information within everyday business and personal activities.

To manage such growing demands, large data centers consisting of many clients and servers are networked together in clusters. Such clusters may be configured to provide various redundant and high availability processes and services. Unfortunately however, such clusters are still susceptible to power outages, which can bring all network traffic to a halt.

FIG. 1 is a block diagram of a conventional server cluster system 100 both before and after a power interruption at time $T_0$. The conventional cluster 100 includes four servers 102–108, coupled respectively to four Uninterruptible Power Supplies (UPSs) 110–116, and which receive standard wall outlet power over line 118. Each UPS typically contains a battery backup (not shown) which provides power to its respective server upon detection of a power interruption and for a period thereafter until the batteries are exhausted.

As shown in FIG. 1, at time $T_0$, all four servers 102–108 are fully operational. However, if a power interruption occurs at time $T_0$, there is a complete failure of the server cluster at time $T_1$, when the UPS batteries have been exhausted. Thus all processes supported by the servers 102–108 are terminated and the network is down. Such a complete failure is indiscriminant of the importance of any traffic passing through or processes being executed by the servers, and is very much an "all or nothing" power management design. Such designs fall short of client expectations and network demands in this modern era.

In response to the concerns discussed above, what is needed is a system and method for server cluster power management that overcomes the problems of the prior art.

SUMMARY OF THE INVENTION

The present invention is a system and method for Quality of Service (QoS) based server cluster power management. The method of the present invention includes the steps of: grouping activities within a server cluster into predefined sets; assigning a priority level to each set; identifying a first server hosting a first set of lower-priority activities within the cluster; receiving a power interruption signal; and diverting power reserves of the first server to another server in the cluster, in response to the power interruption signal.

The system of the present invention includes: servers, hosting a plurality of activity sets each having an associated QoS level; power reserves coupled to the servers; a switch matrix coupled to direct the power reserves between the servers; and a power manager, coupled to the switch matrix, for commanding the switch matrix to divert power from servers hosting low QoS activity sets to servers hosting high-priority activity sets, in response to a power interruption.

The system and method of the present invention are particularly advantageous over the prior art because QoS concepts are applied to server cluster power management. These and other aspects of the invention will be recognized by those skilled in the art upon review of the detailed description, drawings, and claims set forth below.

DETAILED DESCRIPTION OF THE PREFERRED EMBODIMENT

Figure 1:
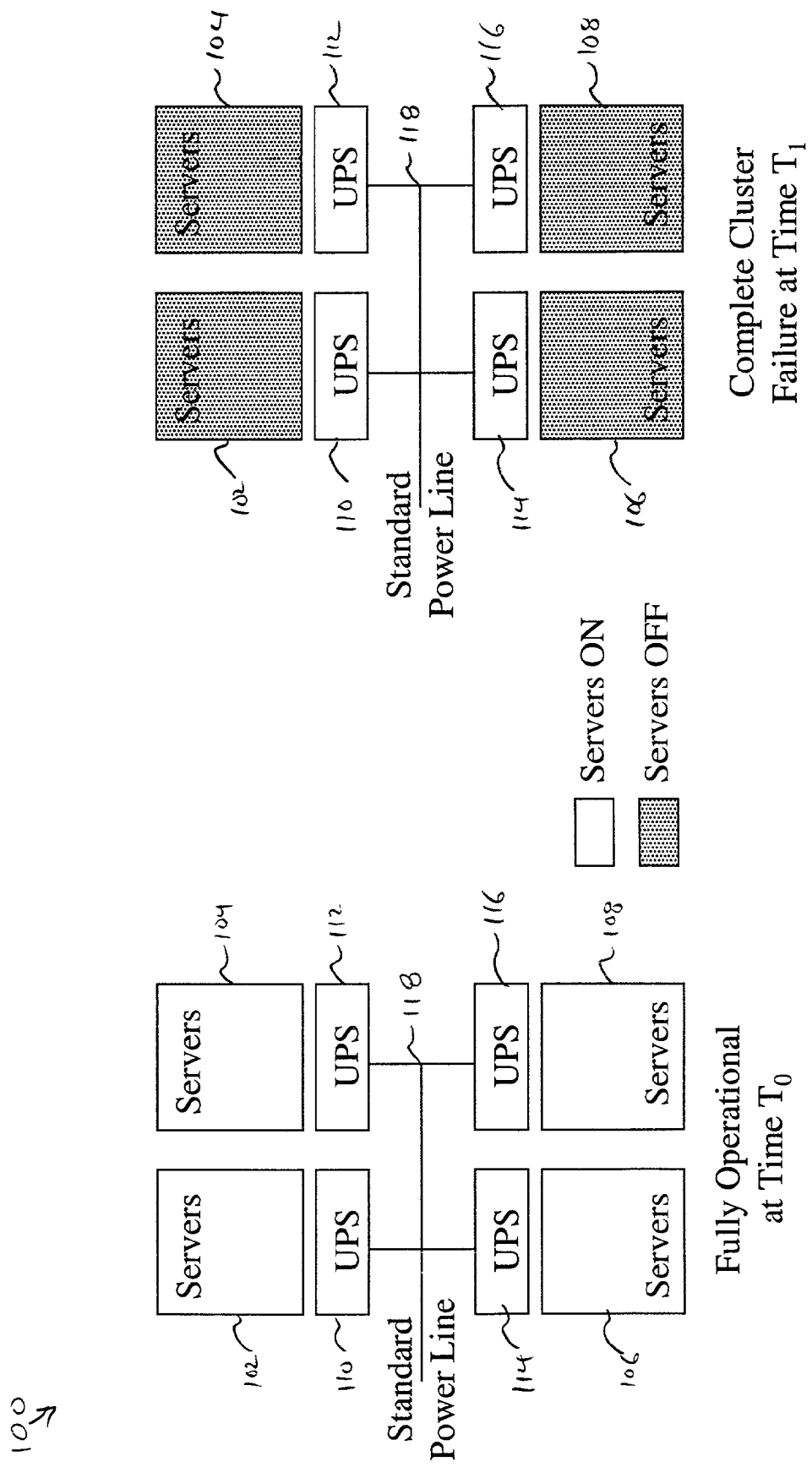
FIG. 1 is a block diagram of a conventional server cluster system.
Figure 2:
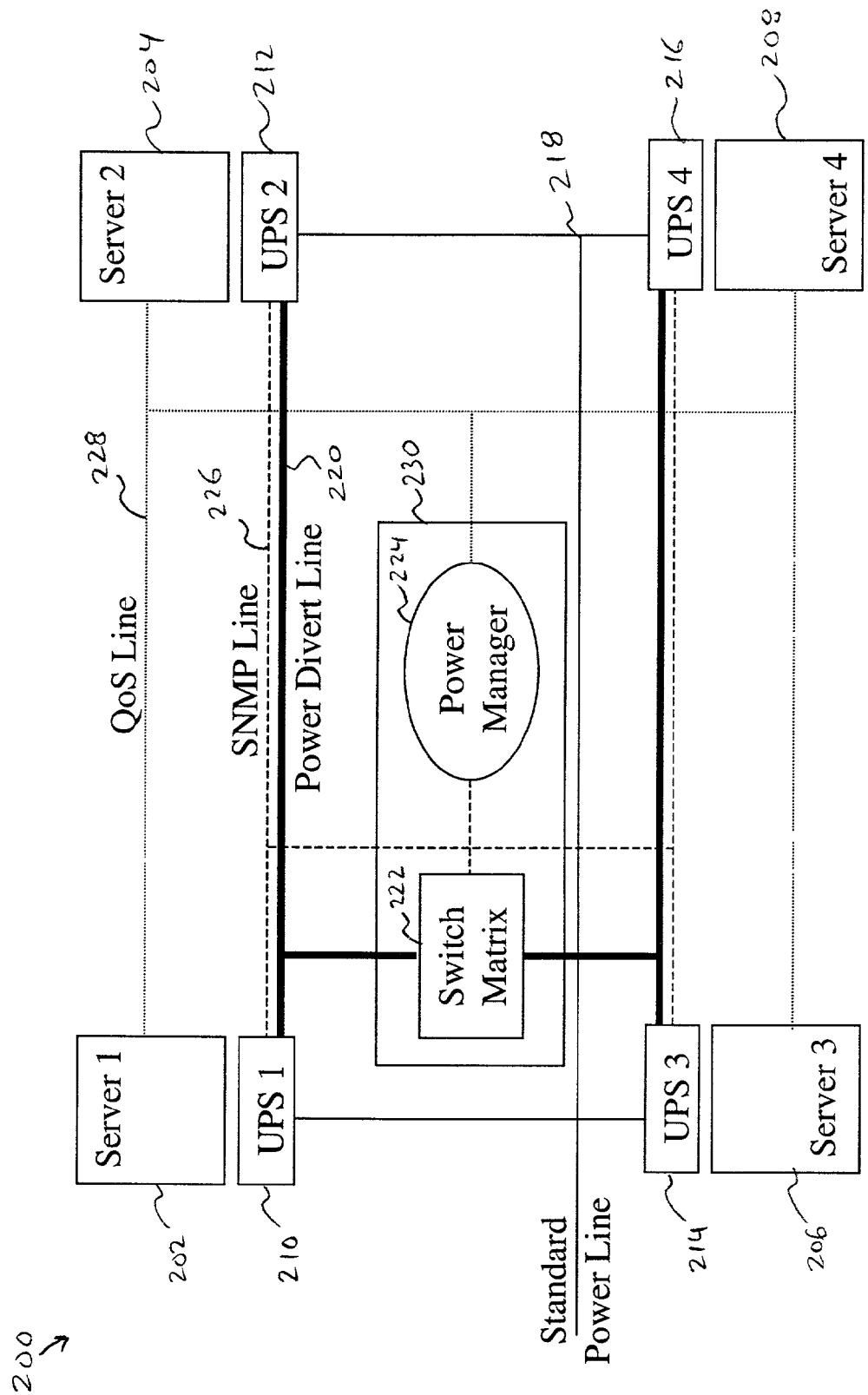
FIG. 2 is a block diagram of a Quality of Service (QoS) based server cluster power management system.

FIG. 2 is a block diagram of a Quality of Service (QoS) based server cluster power management system 200. The system 200, shown in just one of many possible embodiments, includes servers 1 through 4 (202–208), each provided power by Uninterruptible Power Supplies (UPSs) 1 through 4 (210–216) respectively. A standard power line 218 provides wall outlet power to each of the UPSs 210–216. Batteries within each UPS are connected to a power divert line 220. The power divert line 220 is coupled to a switch matrix 222 which can divert battery power from a set of UPSs to any other set of UPSs. A power manager 224 software module, executing power management algorithms, is coupled to the switch matrix 222 and the UPSs 210–216 by a System Network Management Protocol (SNMP) line 226, and to the servers 202–208 by a Quality of Service (QoS) line 226. The power manager 224 and the switch matrix 222 are preferably housed in a power controller 230. Together these elements make up a server cluster network. Operation of the system 200 is discussed in FIG. 3.

Figure 3:
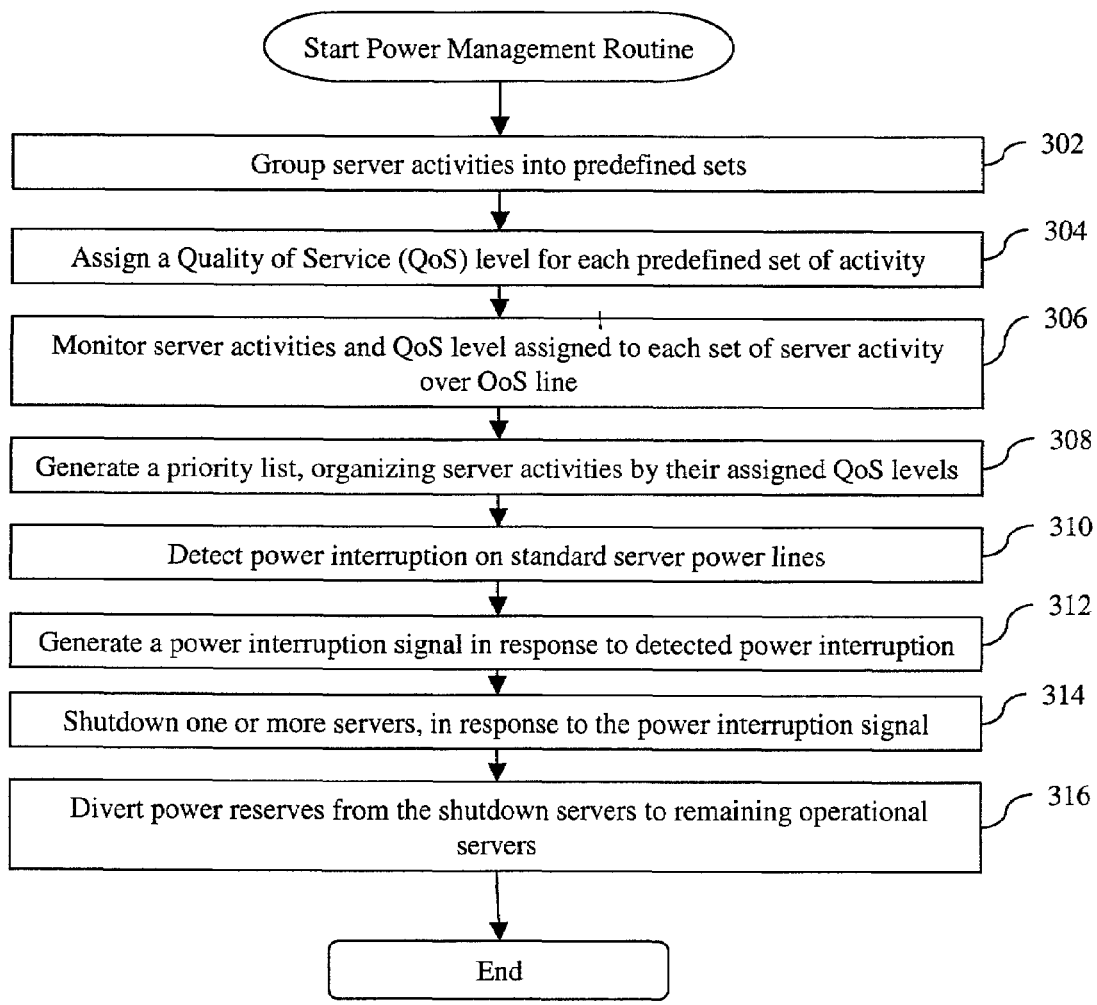
FIG. 3 is a flowchart of a method for Quality of Service based server cluster power management.

FIG. 3 is a flowchart of a method 300 for Quality of Service (QoS) based server cluster power management. Quality of Service (QoS) is a standard phrase originating from an idea that client-server network performance, such as transmission and error rates, can be managed in real time. And, while such QoS concepts have been applied to network packet switching and data management, they have not been applied to diverting power between different servers within a server cluster.

The method begins in step 302, where a network administrator groups server activities into predefined sets. The predefined sets are defined by the network administrator depending upon how the administrator intends to manage power reserves within the network after a power interruption occurs. Examples of such predefined sets include: types of data transmitted by each of the servers 202–208 over the network; processes and applications, redundant or otherwise, executing on each of the servers 202–208; or any other useful differentiation of activity on the servers 202–208. Data types include: voice, video, and bulk data. Processes and applications include: e-mail, word processing, virus detection, firewalls, daemons, as well as many others.

In step 304, the network administrator assigns a QoS level to each set. Activity sets assigned a higher QoS can also be thought of as having a higher operational priority level. In step 306, the power manager 224 monitors server activities and the QoS level assigned to each set of server activity over QoS line 228. QoS levels are transmitted over the QoS line 228 preferably follow a Common Open Policy Service Protocol (COPS). COPS is a protocol for exchanging QoS information over a network. COPS protocols are discussed in an Internet-Draft working document generated by the Internet Engineering Task Force (IETF). In step 308, the power manager 224 generates a priority list, organizing server activities based on their assigned QoS levels.

In step 310, one or more of the UPSs 210–216 detect a power interruption on the standard power line 218. In response, a power interruption signal is sent from the UPS's 210–216 to the power manager 224 over the SNMP line 226, in step 312. Next, in step 314, the power manager 224 sends a server shutdown command to one or more of the UPSs 210–216 over the SNMP line 226.

The power manager 224 selects which of the servers 202–208 to shutdown based on the priority list. How exactly the shutdown selections are made, however, is dependent upon how the network administrator programs the power manager 224 to respond to the power interruption signal. For example, the network administrator can program the power manager 224 to identify the server hosting an activity which is highest on the priority list and shutdown all other servers. Or, the network administrator can program the power manager 224 to identify the top five activities on the priority list, command the servers 202–208 to inactivate all other activities on the priority list and transfer those five highest priority activities to a single server and shutdown the other servers. Thus, cluster power management is under full control of the network administrator. Those skilled in the art will also recognize that the present invention provides an ability to divert power between servers for reasons not even related to power interruptions, but instead for any power management reason.

In step 316, the power manager 224 sends a divert battery power command to the switch matrix 222, directing the matrix 222 to reroute reserve battery power from those UPSs sent the server shutdown command to those UPSs powering those servers which remain operational. After step 316, the method 300 ends.

Figure 4:
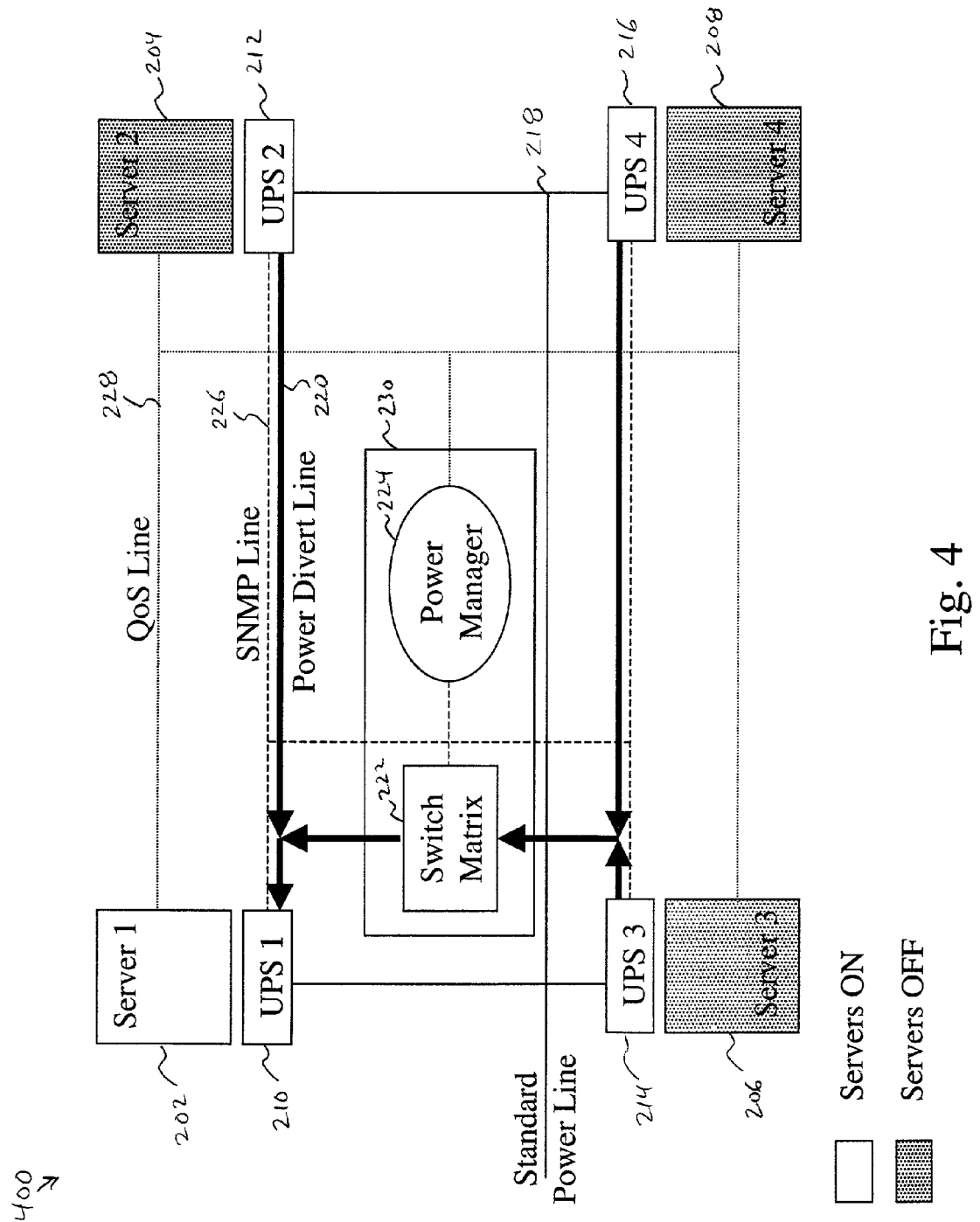
FIG. 4 is a block diagram of one of many possible ways to manage power in the server cluster in response to a power interruption.

FIG. 4 is a block diagram 400 of one of many possible ways to manage power in the server cluster in response to the power interruption on the standard power line 218. In the Figure, the power manager 224 has commanded: UPS 2 212 to shutdown server 2 204, UPS 3 214 to shutdown server 3 206, UPS 2 216 to shutdown server 2 208, and the switch matrix 222 to route reserve battery power from UPSs 1, 2 and 3 (212, 214, and 216) to UPS 1 210 so that server 1 202 can be kept operational for as long as possible during the power interruption.

Figure 5:
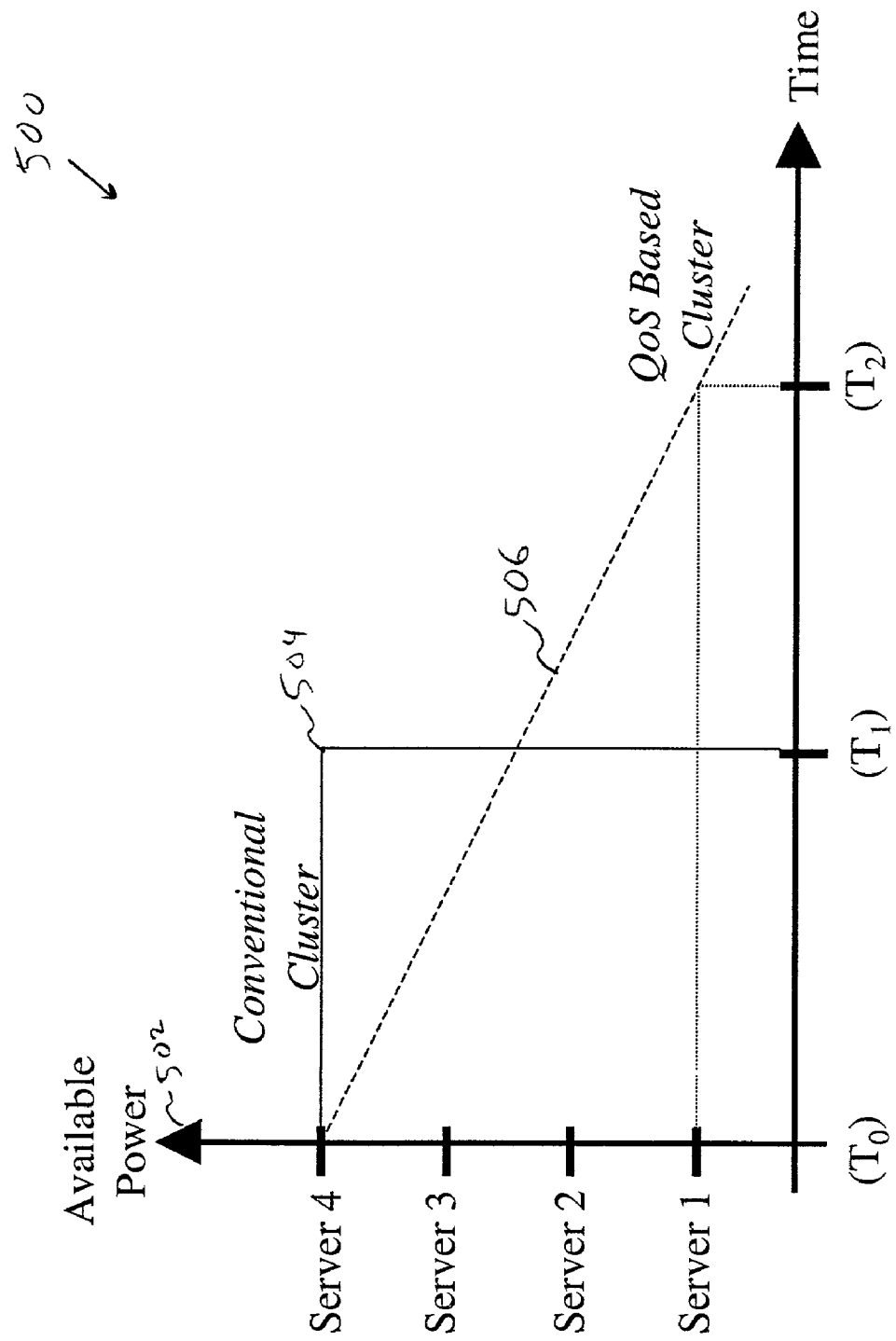
FIG. 5 is a graph of how a power interruption affects available server cluster power in both the QoS based system and the conventional server cluster system.

FIG. 5 is a graph 500 of how a power interruption, at time $T_0$, affects available server cluster power 502 in both the QoS based system 200 and the conventional server cluster system 100. As shown by curve 504, when a power interruption occurs at time $T_0$ in the conventional system 100, a step-wise complete power failure of servers 1 through 4 (102–108) occurs at time $T_1$, as battery reserves in the conventional system's 100 UPSs 110–116 are exhausted all at about the same time. Total system 100 battery reserves are equal to an area under curve 502.

In contrast, as shown by curve 506, when a power interruption occurs at time $T_0$ in the QoS based system 200 and servers 2 through 4 (204–208) are shutdown and battery reserves in UPSs 212–216 are diverted to server 1 202, server 1's 202 time of operation is extended to a time $T_2$, which is far beyond time $T_1$.

Thus while total QoS system 200 battery reserves (equal to an area under curve 504) are equal to total conventional system 100 battery reserves, the present invention manages that same limited reserve of battery power so that server 1's 202 operation may be extended until time $T_2$. As a result, those activities highest on the priority list may continue servicing the cluster network beyond that of conventional systems 100.

Figure 6:
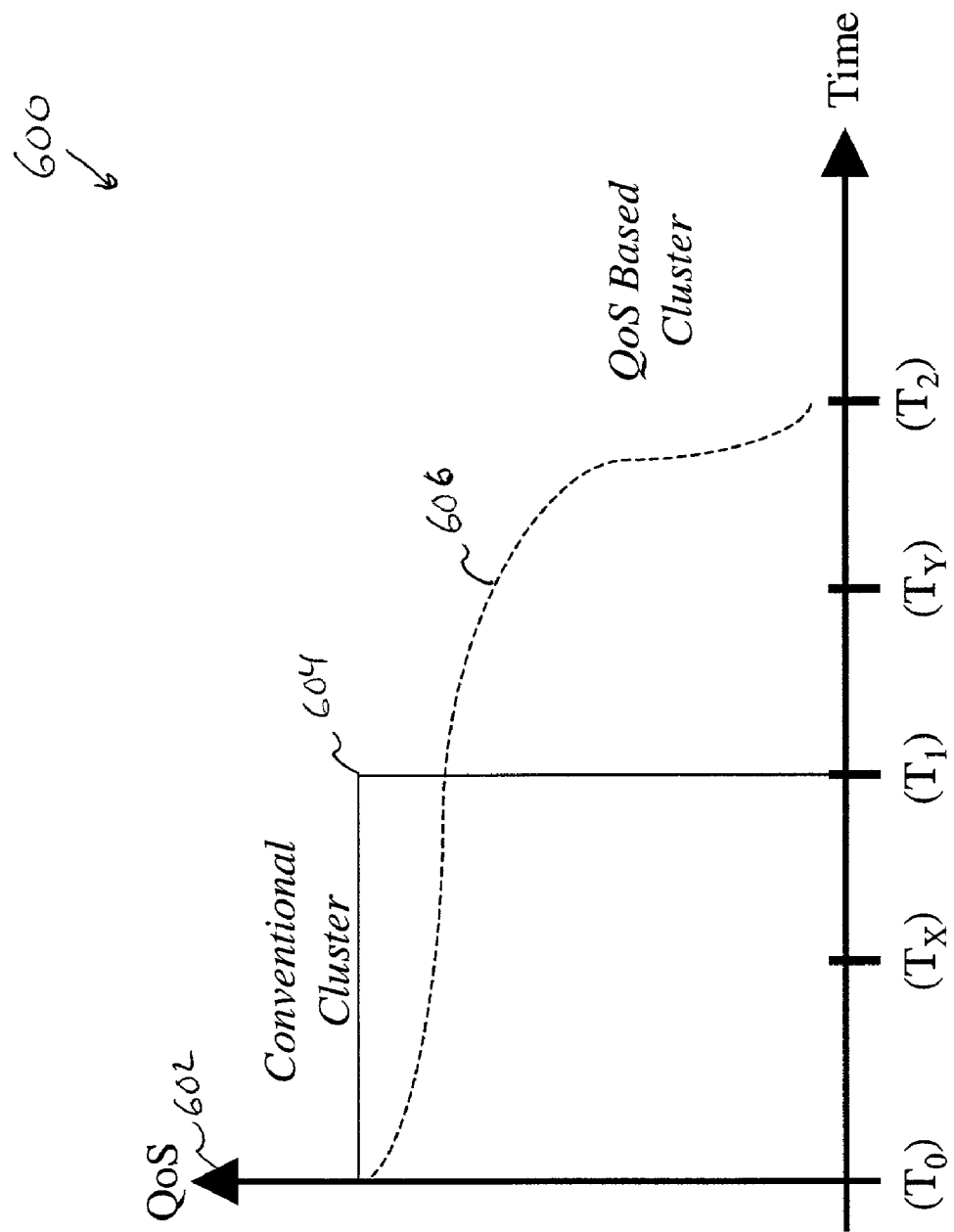
FIG. 6 is a graph of how a power interruption affects QoS in both the QoS based system and the conventional server cluster system.

FIG. 6 is a graph 600 of how a power interruption, at time $T_0$, affects QoS 602 in both the QoS based system 200 and the conventional server cluster system 100. As shown by curve 604, when a power interruption occurs at time $T_0$ in the conventional system 100, a step-wise complete shutdown of all activities on servers 1 through 4 (102–108) occurs at time $T_1$, as battery reserves in the conventional system's 100 UPSs 110–116 are exhausted all at about the same time.

In contrast, as shown by curve 606, when a power interruption occurs at time $T_0$ in the QoS based system 200 and servers 2 through 4 (204–208) are shutdown and battery reserves in UPSs 212–216 are diverted to server 1 202, server 1's 202 overall Quality of Service for hosted high-priority activities is extended until time $T_2$. The curve 606 also shows that, depending upon how QoS, is measured QoS may initially dip below QoS for the conventional system 100, at time $T_X$, QoS is basically maintained at a constant level all the way until time $T_Y$, in the QoS based system 200. Depending upon how the network administrator configures the power manager 224, the initial dip can be due to a shutdown of lower-priority activities that can not be maintained on server 1 202, while the conventional system 100 continues to host all activities. The somewhat graceful decline in QoS from time $T_0$ until $T_2$ is again determined by how the network administrator configures the power manager 224, and can be due to the power manager 224 incrementally shutting down lower-priority server activities as power reserves dwindle.

While one or more embodiments of the present invention have been described, those skilled in the art will recognize that various modifications may be made. Variations upon and modifications to these embodiments are provided by the present invention, which is limited only by the following claims.

What is claimed is:

1. A method for server cluster power management, comprising:
   grouping activities within a server cluster into at least a high and a low priority group and wherein a group includes at least one activity;
   receiving a power interruption signal;
   shifting a group of high priority activities to a first server in the cluster in response to the power interruption signal;
   diverting power reserves of a second server in the server cluster to the first server in response to the power interruption signal; and
   diverting a low priority activity to another server in the cluster.

2. The method of claim 1 wherein the grouping step includes:
grouping activities by data type.

3. The method of claim 1 wherein the grouping includes:
grouping activities by process.

4. The method of claim 1 wherein the grouping includes:
defining activity sets based on Quality of Service according to a Common Open Policy Service Protocol (COPS).

5. The method of claim 1 wherein the grouping is based, in part, on the Quality of Service associated with an activity.

6. The method of claim 1 wherein the receiving the power interruption signal includes:
receiving the power interruption signal, in response to a network administrator command.

7. The method of claim 1 wherein the diverting includes:
diverting battery power reserves of the second server to the first server in the cluster.

8. The method of claim 1 further comprising:
identifying the first server as a server hosting a highest priority activity; and diverting power reserves from all other cluster servers to the first server.

9. A method for server cluster power management, comprising:
grouping activities within a server cluster into at least a high and a low priority group and wherein a group includes at least one activity;
receiving a power interruption signal;
shifting a group of high priority activities to a first server in the cluster in response to the power interruption signal;
diverting power reserves of a second server in the server cluster to the first server in response to the power interruption signal; and
incrementally shutting down lower-priority activities on the first server as power reserves dwindle.

10. The method of claim 9 further comprising:
identifying the first server as a server hosting a highest priority activity; and diverting power reserves from all other cluster servers to the first server.

11. A method for server cluster power management, comprising:
grouping activities within a server cluster into predefined sets;
assigning a priority level to each set;
receiving a power interruption signal;
programmatically identifying a priority server hosting a highest priority activity;
diverting power reserves from all servers to the priority server, in response to the power interruption signal; and
incrementally shutting down lower-priority activities on the priority server as power reserves dwindle.

12. A computer-usable medium embodying computer program code for commanding a computer to perform server cluster power management comprising:
grouping activities within a server cluster into predefined sets;
assigning a priority level to each set;
programmatically identifying a first server hosting a first set of lower-priority activities within the cluster;
receiving a power interruption signal;
diverting power reserves of the first server to another server in the cluster, in response to the power interruption signal; and
diverting the first set of lower-priority activities to another server in the cluster.

13. The medium of claim 12 wherein the assigning the priority level includes:
assigning the priority level based on the Quality of Service associated with the activity set.

14. The medium of claim 12 wherein the receiving the power interruption signal includes:
receiving the power interruption signal, in response to a server cluster power failure.

15. The medium of claim 12 wherein the receiving the power interruption signal includes:
receiving the power interruption signal, in response to a network administrator command.

16. The medium of claim 12 further comprising:
identifying a second server hosting an activity which is highest on the priority list;
diverting power reserves from all servers to the second server.

17. A Computer-usable medium embodying computer program code for commanding a computer to perform server cluster power management comprising:
grouping activities within a server cluster into predefined sets;
assigning a priority level to each set;
programmatically identifying a first server hosting a first set of lower-priority activities within the cluster;
receiving a power interruption signal;
diverting power reserves of the first server to a second server in the cluster, in response to the power interruption signal; and
incrementally shutting down lower-priority activities on the second server as power reserves dwindle.

18. The medium of claim 17 wherein the receiving the power interruption signal includes:
receiving the power interruption signal, in response to a server cluster power failure.

19. The medium of claim 17 wherein the receiving the power interruption signal includes:
receiving the power interruption signal, in response to a network administrator command.

20. The medium of claim 17 further comprising:
identifying a second server hosting an activity which is highest on the priority list;
diverting power reserves from all servers to the second server.

* * * * *